United States Patent [19]
Lémery

[11] 3,989,204
[45] Nov. 2, 1976

[54] FLY FISHING REEL
[75] Inventor: Jean-Paul Lémery, Cluses, France
[73] Assignee: Carpano & Pons S.A., France
[22] Filed: Feb. 11, 1971
[21] Appl. No.: 114,727

Related U.S. Application Data
[63] Continuation of Ser. No. 788,116, Dec. 23, 1968, abandoned.

[30] Foreign Application Priority Data
Jan. 5, 1968 France .................. 68.134935

[52] U.S. Cl. .................................... 242/84.5 R
[51] Int. Cl.² ................................ A01K 89/02
[58] Field of Search ........... 242/84.51 R, 84.5 R, 242/107.4, 214, 215, 217

[56] References Cited
UNITED STATES PATENTS

| | | | |
|---|---|---|---|
| 1,005,154 | 10/1911 | Catucci | 242/84.5 R |
| 1,871,386 | 8/1932 | Pflueger | 242/84.51 R |
| 2,059,765 | 11/1936 | Adams | 242/84.5 R |
| 2,180,566 | 11/1939 | Thompson | 242/84.51 R |
| 2,190,398 | 2/1940 | Bugatti | 242/84.51 R |
| 2,417,732 | 3/1947 | Bland et al. | 242/84.51 R |
| 2,551,567 | 5/1951 | Reyburn | 242/84.51 R |
| 2,993,660 | 7/1961 | Parks | 242/84.51 R |
| 3,100,609 | 8/1963 | Wrighton | 242/107.4 |
| 3,506,214 | 4/1970 | Laszlo | 242/84.5 R |

FOREIGN PATENTS OR APPLICATIONS

| | | | |
|---|---|---|---|
| 179,039 | 4/1962 | Sweden | 242/84.21 R |
| 950,227 | 2/1964 | United Kingdom | 242/84.51 |

*Primary Examiner*—Billy S. Taylor
*Attorney, Agent, or Firm*—Robert E. Burns; Emmanuel J. Lobato; Bruce L. Adams

[57] ABSTRACT

A fly fishing reel comprising a spool rotatably mounted in a casing and braking means for impeding rotation of the spool in one direction. The braking means comprises a ring mounted within the casing for rotation with the spool, a pawl pivotally connected to the ring, and a rotatable plate having a ratchet engageable with the pawl whereby the pawl and spool effect rotation of the plate. A washer is disposed between the casing and the plate for frictionally impeding rotation of the plate. A spring is provided for urging the plate against the washer and toward the casing and thereby preventing rotation of the plate when the spool and ring rotate in one direction, and causing the plate to rotate with the ring and spool when the spool is rotated in the other direction.

8 Claims, 4 Drawing Figures

FLY FISHING REEL

This application is a continuation of Ser. No. 788,116, filed Dec. 23, 1968, and now abandoned.

It is already known for fly fishing to use silk fishing line rolled on a reel fixed to the rod and which plays no part during the casting and influences neither the length nor precision of the cast, which characteristics depend essentially on the fisherman.

The reel is thus, in this type of fishing, only a reservoir in which can be stored thirty or so meters of line which must be allowed to unroll without resistance and capable of being drawn in automatically or manually.

These reels are generally equipped with a brake intended to oppose winding out of the line when the fish pulls and a noise signalling this movement to the fisherman. In certain reels, the braking is permanent and operates whatever the sense of rotation of the spool. Otherwise, its value is not adjustable. The braking is obtained by a spring equally carrying out the function of a noise-making pawl so that these reels make a noise whatever the sense of rotation of the spool. Certain reels of this type include a control means allowing variation of the pressure of the spring on the noise-making pawl so that the braking is thus adjustable within a given range.

In other reels, the braking means of the spool is separate from the noise-making pawl and allows adjustment of the amount of braking. In certain cases the braking is carried out solely when the reel is winding out. However, in these reels, the noise-making pawl makes a noise whatever the direction of rotation of the spool and the noise of the pawl during winding in of the line uselessly frightens the fish.

The invention is concerned with a reel with manual control for fly fishing comprising a rotatable spool of line and braking means including a movable organ, on which friction means act, moved only for one of the two directions of rotation of the spool, characterized in that the said movable organ controls a noise-making pawl.

The invention will now be described with reference to the accompanying drawings given by way of non limiting example, in which.

Figure 1:
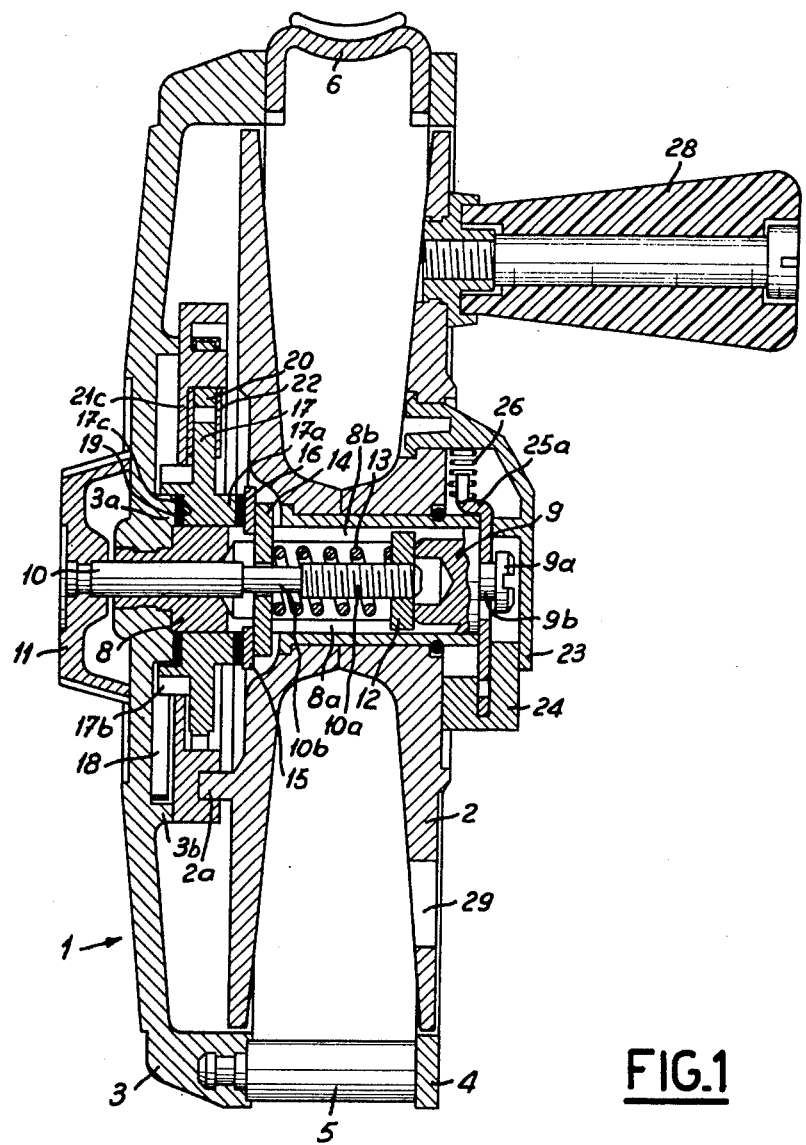
FIG. 1 is a vertical cross section of a fly reel with manual control.

The reel for fly fishing shown in the drawings comprises a casing 1 on which is removably fixed a spool 2 for the line.

This casing 1 is constituted by a circular side 3, for example in plastics material, and by a ring 4 fixed to the side on the one hand by struts 5 and on the other hand by a part 6 including 2 feet for fixation of the reel to the rod. Between two neighbouring struts, the casing otherwise includes an armature acting as line guide. The side 3 forms a sort of dome in the centre in which is provided a tubular axle 8, slotted longitudinally at 8a and of which the right hand extremity, in the drawing, is fixed to receive a stopper 9.

In the opening of the axle 8 is disposed an extension 10 of which the left hand extremity carries a button 11 and the right hand extremity is threaded at 10a and lathed to a smaller diameter at 10b.

On the threaded extremity 10a of the stem 10 is screwed a nut 12 provided on its side with a radial flange 12a by which this nut is held with the sides of the slot 8a of the axle 8, so that any rotation of the extension 10 causes, by screwing of the nut 12, an axial displacement of this screw at the interior of the axle 8.

This nut 12 is intended to compress a spring 13 encircling the extension 10 and otherwise resting on a part 14 carrying on its side two diametrically opposed projections 14a and 14b respectively traversing the slot 8a and an orifice 8b and coming to rest by their extremity on a ring 15 angularly fixed on the axle 8 by a flange penetrating in the slot 8a.

The ring 15 is in contact by its left hand surface with a second friction ring 16 taking support in its turn on an annular protuberance 17a which carries a toothed plate 17 pivotably mounted on the axle 8 and capable of being axially placed on this axle.

This plate presents, in addition to its peripheral toothing, equally a second toothing 17b on its side opposed to the protuberance 17a with which a noise-making pawl 18 comes into contact.

Between the axis 8 of the toothing 17b, the plate 17 is otherwise provided with an annular housing 17c of which the bottom forms the support surface of the plate on a side of a friction ring 19 in contact by its other face with an annular protuberance 3a provided at the centre of the side 3.

It is understood that a more or less pronounced screwing of the nut 12 on the extension 10, by rotation of the button 11, will correspond to a more or less strong force provided by the spring 13 on the black 14 and leading to a corresponding braking more or less accentuated provided by the friction rings 16 and 19 which oppose eventual rotary displacement of the toothed plate 17. Such a braking is of course provided whatever the direction of rotation of plate 17.

To this end, the plate 17 is capable of being actuated by the spool due to the pawl 20 articulated on the catch 21a which is provided on the ring 21 pivotably mounted around the crown of plate 17 which forms a flange at the interior of a triangular housing 21b of this ring.

The pawl 20 is disposed in the opening of a U-spring 22 equally pivoted on the catch 21a and compressing by its extremities the plate 17 by one part or another of its toothing. A flat part 20a of the pawl presses on the bottom of the spring. Thus, for a given sense of rotation of the ring 21, the U-spring 22 pivots in one direction, moving the pawl 20 which comes into engagement with the toothing of the plate 17. For a rotation in the opposite direction, the spring 22 pivots in the other direction and disengages the pawl 20 so that the plate 17 is no longer moved.

Consequently, if the crown 21 is kinematically solid to the bobbin 2, any rotation in an anti-clockwise direction (FIG. 2) of this spool can only take place in opposition to the braking action with which the toothed plate 17 will be the object of the previously indicated part of the mechanism, (part 19 - 16 - 14 - 13 - 12 - 10) whilst rotation in a clockwise direction of this spool will not cause the displacement of plate 17.

Concerning the crown 21, it has still to be noted that it will preferably be made of automatically lubricated plastics matter and that its axial position around the plate 17 will be assured by a collar 21c coming into support against the back face of this plate and by contact with an annular band 3b of side 3.

It is also to be noted that, since for one given direction of rotation of the ring 21, the plate 17 is not moved, the noise made by the pawl 18 and the gearing 17b will equally not be caused, which means that winding out of the line of the spool 2 will take place in silence.

Otherwise, it is still to be noted that, because of its inventive nature, the reel according to the invention can advantageously be used by left or right handed fisherman since it is sufficient to remove the pawl 20 and its spring 22 from the teeth 21a and to replace these elements in the opposite direction on the teeth so that the pawl will thus enter into contact with the toothing of the plate 17 when this plate is moved in a clockwise sense.

Additionally, when the pawl is in its non use position, which corresponds to a rotation of the spool in an unwinding direction of the line, the spring 22 remains always in contact with a part of its extremities against the toothed plate 17 and will produce because of this fact a slight braking effort preventing rolling up of this spool in giving knots of line.

Figure 2:
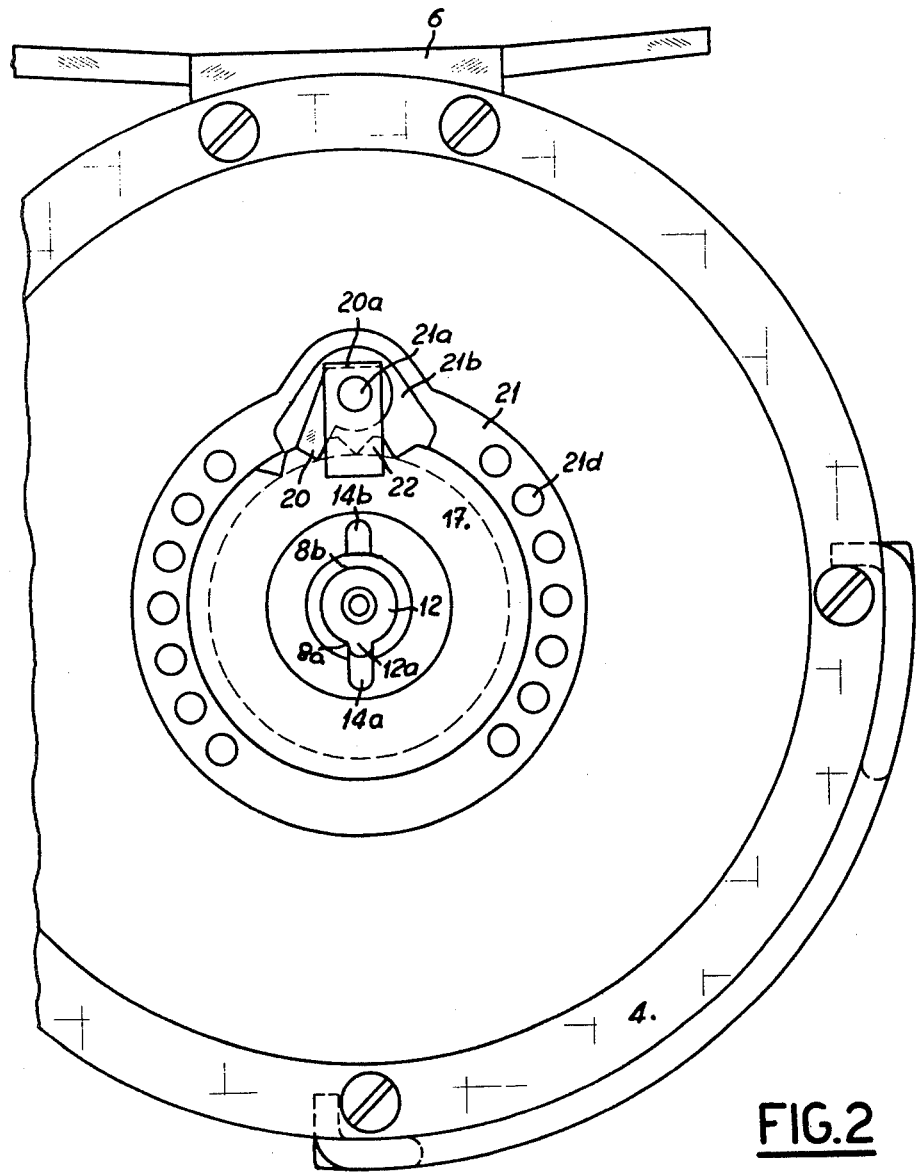
FIG. 2 is a face view of A of FIG. 1, the reel spool having been removed.
Figure 3:
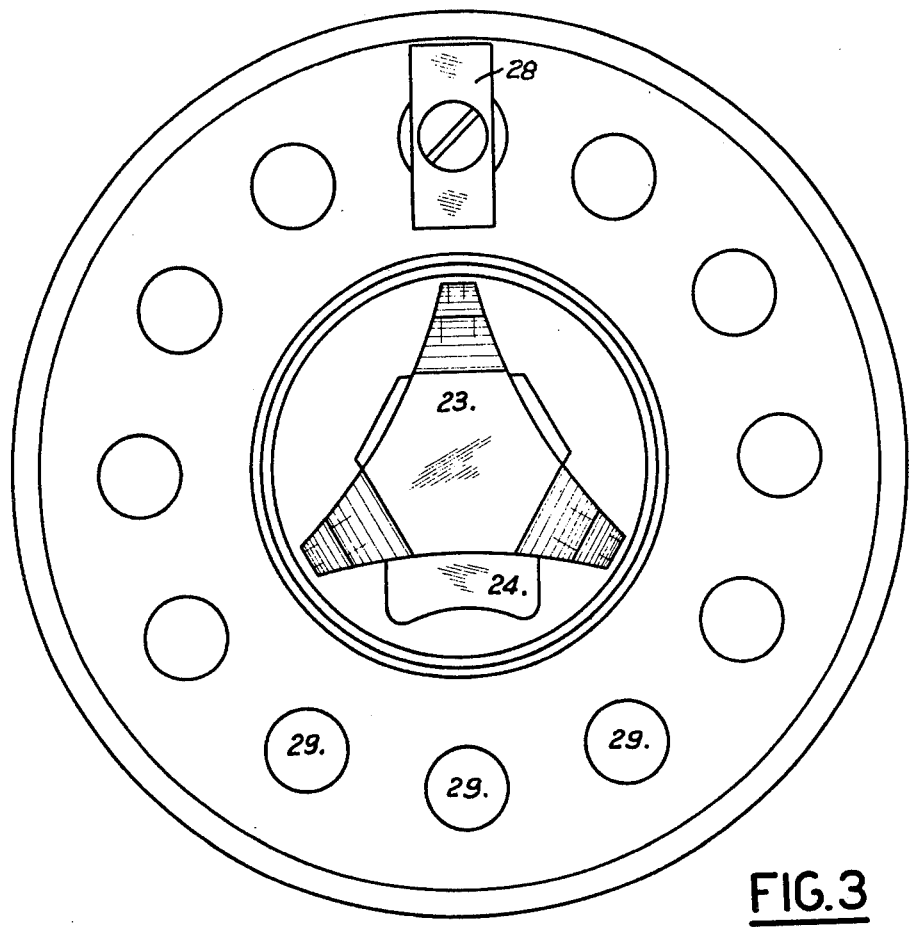
FIG. 3 is a lateral elevational view of this spool.
Figure 4:
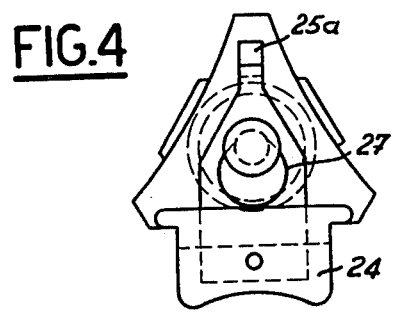
FIG. 4 shows, in cross section, a detail of the spool.

The liaison between the spool 2 and the crown 21 can only be movable since this spool must be capable of being easily removed from the reel by sliding on the axle 8. To this end, it is previewed that the left hand side of this spool (FIG. 1) will be provided with pins, preferably two, such as 2a inserted in bores 21d provided on the lateral face of the ring 21 (FIG. 2).

To assure axial fixing of the spool on the axle 8, this is provided on its right hand side (FIG. 1) with a latching device, partly hidden by a button 23 of substantially triangular form, on one of the sides which flange a command button 24. This button is in fact solid on one extremity of a plaque 25 of which the other extremity 25a is shouldered and is engaged in the opening of a recall spring 26 tending to maintain the button in the flange position.

The plate 25 is pierced with an oval hole 27 cooperating with a groove 9b of the head 9a of stopper 9. In the rest position, all disengagement between the head 9a and the plate is impossible. To allow this, the user must press the oval hole 27 in front of the head 9a.

As represented in the drawing, it is shown in addition that the right side of the spool is provided with a handle 28 to turn the reel and that this side is otherwise pierced with a series of circular windows 29 allowing the fisherman, when the handle is broken for example, to turn the spool all the same by inserting in one of the windows the extremity of a branch or of a pencil for example.

What I claim and desire to secure by Letters Patent is:

1. In a fly fishing reel including a casing, a spool rotatably mounted to the casing, and braking means for impeding rotation of the spool in one direction of its rotation, the improvement wherein said braking means comprise a ring mounted within the casing for rotation with said spool, axially slidable means for interconnecting said ring to said spool during use of the fly fishing reel to effect rotation of said ring in response to rotation of said spool and for permitting said spool to be removed from said ring during non-use of the fly fishing reel, a pawl pivotally connected to said ring, a plate rotatably mounted within the casing and disposed coaxially with said spool, said plate having ratchet means for engaging said pawl, adjustable friction means connected to said plate for adjusting the resistance to rotation of said plate, and pawl-controlling means controlling engagement of said pawl with said ratchet means of said plate, said pawl-controlling means comprising a U-shaped spring member pivoted on said ring coaxially with said pawl and having opposite leg portions frictionally gripping said plate between them such that the friction engagement of said plate with said leg portions effects movement of said pawl to a position out of engagement with said ratchet means when said spool is rotated in one direction and into engagement with said ratchet means when said spool is rotated in the opposite direction, whereby said pawl and ratchet disengagement and engagement permit said plate to remain stationary when said spool is rotated in one direction, and causes said plate to rotate with said ring and spool when said spool is rotated in the other direction.

2. A fly fishing reel according to claim 1, in which said ring and spool are contiguous and said axially slidable means for interconnecting said ring to said spool comprises a plurality of pins and pin receiving bores at the interface of said ring and spool.

3. A fly fishing reel according to claim 1, in which said spring member straddles said pawl, and said pawl has a non-circular surface engaging said spring member to cause said pawl to pivot with said spring member.

4. In a fly fishing reel including a casing, a hollow axle fixed to the casing, a spool rotatably mounted on said axle, and braking means for impeding rotation of the spool in one direction of its rotation, the improvement wherein said braking means comprises a ring mounted within the casing for rotation with said spool, axially engageable means for interconnecting said ring and said spool to permit said spool to be removed from said ring, a pawl pivotally connected to said ring, a plate rotatably mounted within the casing and disposed coaxially with said spool, said plate having ratchet means engageable by said pawl, and adjustable friction means coacting with said plate for adjusting the resistance to rotation of said plate, said friction means comprising a washer disposed between the casing and said plate for frictionally impeding rotation of said plate and spring means for urging said plate against said washer and toward said casing, said spring means being disposed in said hollow axle, whereby said pawl and ratchet engagement permits said plate to remain stationary when said spool is rotated in one direction, and causes said plate to rotate with said ring and spool when said spool is rotated in the other direction.

5. A fly fishing reel according to claim 4, in which said spring means comprises a shaft rotatably mounted coaxially within said axle, a nut threaded on said shaft, means fixing said nut against rotation but providing for axial movement upon rotation of said shaft, a coil spring disposed on said shaft and having one end in engagement with said nut, and a block having an opening receiving said shaft, and being disposed between the other end of said spring and said plate.

6. A fly fishing reel according to claim 5, further comprising latching means for releasably grasping said shaft, said latching means being movable to release said spool from said axle.

7. In a fly fishing reel including a casing, a hollow axle fixed to the casing, a spool rotatably mounted on said axle, and braking means for impeding rotation of the spool in one direction of its rotation, the improvement wherein said braking means comprises a plate rotatably mounted within the casing and disposed coaxially with said spool, means clutching said plate to the spool in one direction of rotation of the spool, noise making means operable only in said one direction of rotation of said spool, a washer disposed between the casing and said plate for frictionally impeding rotation of said plate, and spring means for urging said plate against said washer and toward the casing, said spring means being disposed within said hollow axle.

8. A fly fishing reel according to claim 7, in which said spring means comprises a shaft rotatably mounted coaxially within said axle, a nut threaded on said shaft, means fixing said nut against rotation for axial movement upon rotation of said shaft, a coil spring disposed on said shaft and having one end in engagement with said nut, and a block having an opening receiving said shaft, and being disposed between the other end of said spring and said plate.

* * * * *